(12) United States Patent
Kim et al.

(10) Patent No.: US 8,408,798 B2
(45) Date of Patent: Apr. 2, 2013

(54) SPINDLE MOTOR

(75) Inventors: Hyuk Joo Kim, Seoul (KR); Bum Cho Kim, Seoul (KR); Young Ha Park, Gyunggi-do (KR); Tae Young Choi, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 175 days.

(21) Appl. No.: 12/880,531

(22) Filed: Sep. 13, 2010

(65) Prior Publication Data

US 2011/0293209 A1 Dec. 1, 2011

(30) Foreign Application Priority Data

Jun. 1, 2010 (KR) .................. 10-2010-0051946

(51) Int. Cl.
*F16C 32/06* (2006.01)
(52) U.S. Cl. ...................................... 384/107
(58) Field of Classification Search ............... 384/100, 384/107, 111, 112; 360/99.08, 99.09
See application file for complete search history.

(56) References Cited

U.S. PATENT DOCUMENTS

| | | | |
|---|---|---|---|
| 6,900,567 B2 * | 5/2005 | Aiello et al. ............ | 310/90 |
| 7,073,944 B2 * | 7/2006 | Aiello et al. ............ | 384/107 |
| 7,517,153 B2 * | 4/2009 | Engesser et al. ........ | 384/107 |
| 2007/0019894 A1 * | 1/2007 | Yamamoto ............. | 384/107 |
| 2007/0230840 A1 * | 10/2007 | Asada et al. ............ | 384/107 |

FOREIGN PATENT DOCUMENTS

| | | |
|---|---|---|
| JP | 2001-65552 | 3/2001 |
| KR | 10-2006-0114883 | 11/2006 |

OTHER PUBLICATIONS

Office Action in the related Korean Patent App. No. 10-2010-0051946, dated Jul. 14, 2011, with its English translation. A machine translation of the office action was obtained through OCR and translation by Google Docs.

* cited by examiner

*Primary Examiner* — Phillip A Johnson
(74) *Attorney, Agent, or Firm* — Ladas & Parry, LLP

(57) ABSTRACT

Disclosed herein is a spindle motor having a fluid dynamic bearing as an oil gap formed between a rotator and a stator, wherein the stator includes a sleeve having a protruding part extending in a circumferential direction formed on the upper part thereof, the rotator includes a hub including an oil interface forming member positioned under the protruding part of the sleeve and coupled to the lower end thereof, and an oil interface of the oil gap is formed between the upper part of the oil interface forming member and the lower part of the protruding part of the sleeve.

7 Claims, 3 Drawing Sheets

SPINDLE MOTOR

CROSS REFERENCE TO RELATED APPLICATION

This application claims the benefit of Korean Patent Application No. 10-2010-0051946, filed on Jun. 1, 2010, entitled "Spindle Motor", which is hereby incorporated by reference in its entirety into this application.

BACKGROUND OF THE INVENTION

1. Technical Field

The present invention relates to a spindle motor.

2. Description of the Related Art

A spindle motor that is used as a disk driving apparatus driving a recording disk such as a hard disk or the like has been widely used because of the increased necessity of a portable auxiliary memory and subsequently, has improved day-by-day. The spindle motor uses a lubricant fluid such as oil or the like as a fluid dynamic bearing, in order to support a shaft and a sleeve to be relatively rotatable. However, an interface of oil is axially formed so that it is very weak against external impact and the viscosity of oil lowers at high temperature, causing the oil to run down due to gravity.

More specifically, FIG. 1 is a cross-sectional view schematically showing a spindle motor according to the prior art. As shown in the figure, a spindle motor 100 includes a shaft 110, a hub 120, a sleeve 130, a magnet 140, and an armature 150. When power is applied to the armature 150 configured of a core and coils, the shaft 110 and the hub 120 are rotatably driven by electromagnetic force generated between the armature 150 and the magnet 140.

As the interface of oil, used as the fluid dynamic bearing, is formed between the hub 120 and the sleeve 130 opposite to each other in the circumferential direction of the shaft, the interface of oil is very weak against impact in the axial direction of the shaft and the leakage of oil may generate when external impact are applied, while the interface of oil being momentarily collapsed. When viscosity of oil lowers at a high temperature, the viscosity of oil lowers to run down due to gravity.

SUMMARY OF THE INVENTION

The present invention has been made in an effort to provide a spindle motor that forms an interface of oil, used as a fluid dynamic bearing, in an axial direction of a shaft so as to be strong against external impact and prevent the leakage of oil, thereby lengthening the life span of the motor and improving efficiency thereof.

The present invention has also been made in an effort to provide a spindle motor that includes an oil interface forming member coupled to a hub and forms a protruding part on the oil interface forming member to prevent the leakage of oil.

According to the present invention, there is provided a spindle motor having a fluid dynamic bearing as an oil gap formed between a rotator and a stator, wherein the stator includes a sleeve having a protruding part extending in a circumferential direction formed on the upper part thereof, the rotator includes a hub including an oil interface forming member positioned under the protruding part of the sleeve and coupled to the lower end thereof, and an oil interface of the oil gap is formed between the upper part of the oil interface forming member and the lower part of the protruding part of the sleeve.

Further, the cross-section in the circumferential direction of a rotating shaft for the oil interface forming member is formed to have a trapezoid shape where one side of the upper end protrudes towards the sleeve.

Further, the sleeve is provided with a groove part formed on the lower end side of the protruding part and corresponding to the upper end side of the oil interface forming member.

Further, the oil interface forming member is provided with a projection part protruding towards the groove part of the sleeve.

Further, the lower part of the protruding part of the sleeve is provided with an inclined part so that an extension part in the circumferential direction is inclined downwards.

Further, the oil interface forming member is fixed to the hub by laser welding.

The cross-section in the circumferential direction of the rotating shaft for the oil interface forming member according to a second embodiment of the present invention is formed to have a triangular shape where one side of the upper end protrudes towards the sleeve.

Further, the sleeve is provided with a groove part formed on the lower end side of the protruding part and corresponding to the upper end side of the oil interface forming member.

Further, the oil interface forming member is provided with a projection part protruding towards the groove part of the sleeve.

Further, the lower part of the protruding part of the sleeve is provided with an inclined part so that an extension part in the circumferential direction is inclined downwards.

Further, the oil interface forming member is fixed to the hub by selecting one of laser welding, bonding, and screwing.

DESCRIPTION OF THE PREFERRED EMBODIMENTS

Figure 1:
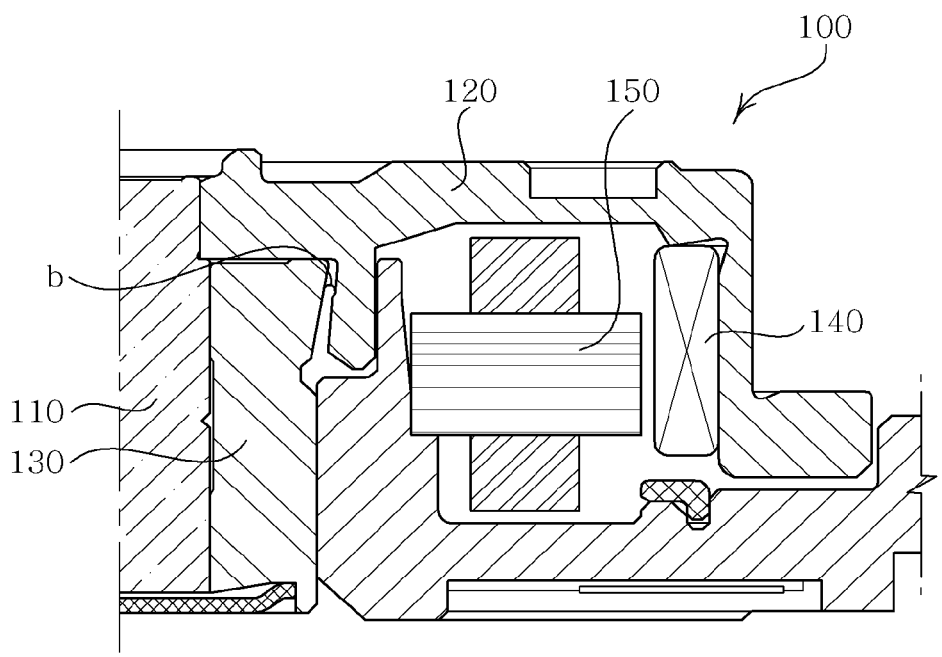
FIG. 1 is a cross-sectional view schematically showing a spindle motor according to the prior art.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

Figure 2:
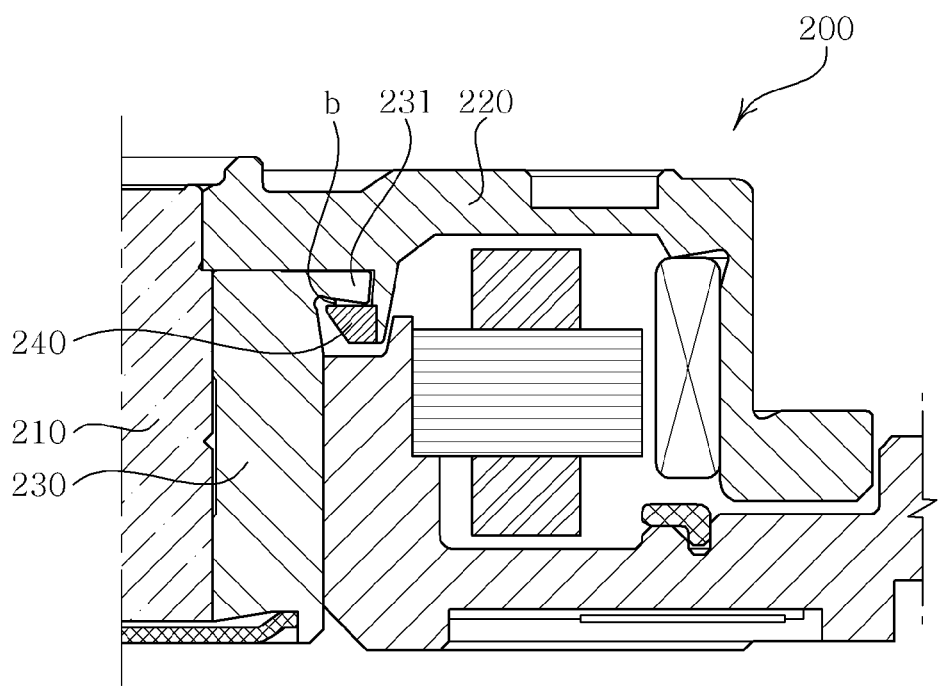
FIG. 2 is a cross-sectional view schematically showing a spindle motor according to a first embodiment of the present invention.
Figure 3:
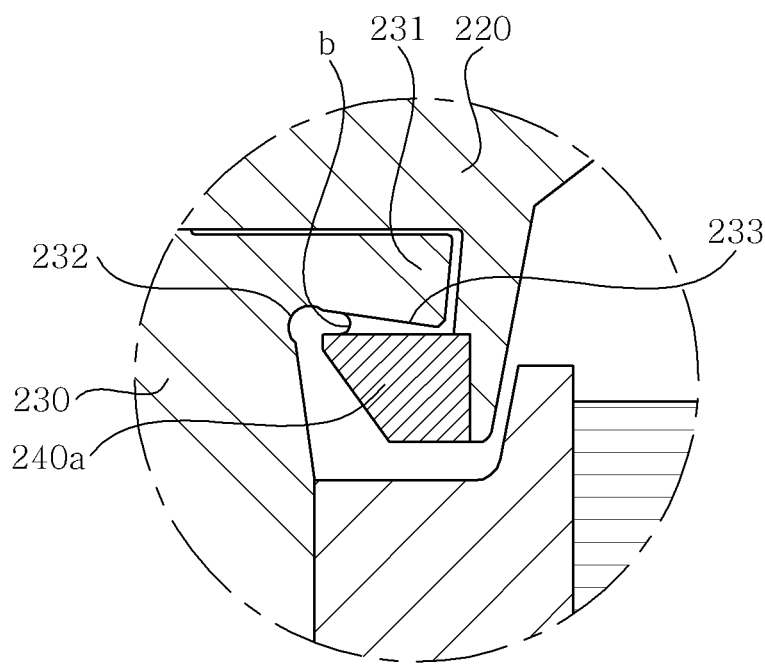
FIG. 3 is a partial enlarged view schematically showing the spindle motor of FIG. 2.

FIG. 2 is a cross-sectional view schematically showing a spindle motor according to a first embodiment of the present invention, and FIG. 3 is a partial enlarged view schematically showing the spindle motor of FIG. 2. As shown in the figures, a spindle motor 200 is provided with a fluid dynamic bearing with an oil gap formed between a rotator and a stator.

More specifically, the rotator includes a rotating shaft 210, a hub 220, a magnet, and the stator includes a sleeve 230 and an armature. The hub 220 includes an oil interface forming member 240a. The oil interface forming member 240a that forms an oil interface in the circumferential direction of the rotating shaft 210 is provided at the lower end side of the hub 220. The cross-section in the circumferential direction of the rotating shaft for the oil interface forming member 240a according to a first embodiment of the present invention as shown in FIGS. 2 and 3 is formed to have a trapezoid shape where one side of the upper end protrudes towards the sleeve 230.

Further, the sleeve 230 is provided with a protruding part 231 formed on the upper part and extended in the circumferential direction, a groove part 232, and an inclined part 233. The groove part 232 is formed on the lower end side of the protruding part 231 and is formed to correspond to the upper end side of the oil interface forming member. The inclined part 233 is formed so that an extension part in the circumferential direction is inclined downwards. When forming the oil interface, a needle may be more deeply perforated by the groove part 232 in order to suck the oil.

As constituted as described above, an oil interface b of an oil gap is formed between the upper side of the oil interface forming member 240a and the lower side of the protruding part 231 of the sleeve, and the oil interface is formed to be supported in the rotating shaft direction of the motor by the oil surface forming member 240a, such that the oil interface b does not easily collapse due to external impact. Even if the oil interface does collapse, it is restored again into a normal interface state by centrifugal force at the time of rotating the motor.

The oil interface forming member 240a according to the present invention may be fixed to the hub by various methods such as bonding, screwing or the like, but it is preferable to be fixed by laser welding.

Figure 4:
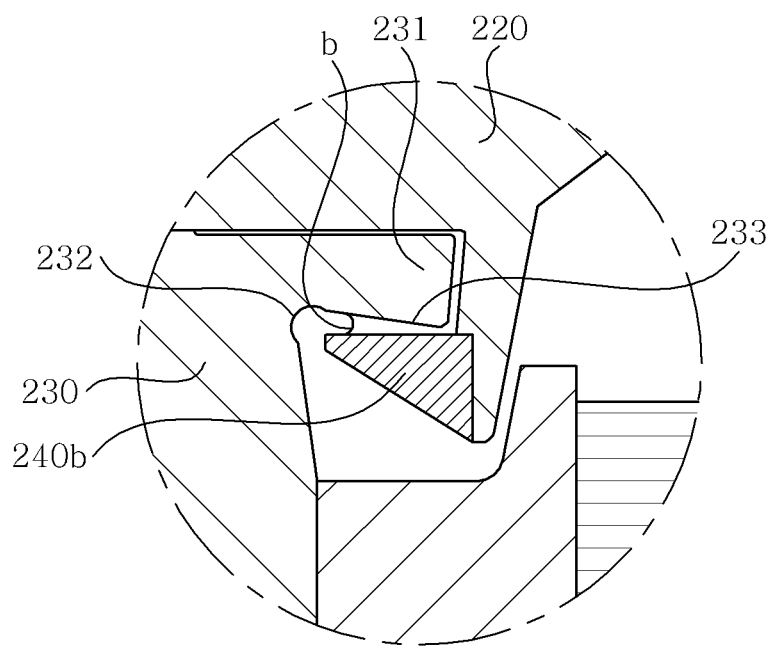
FIG. 4 is a partial enlarged cross-sectional view schematically showing a spindle motor according to a second embodiment of the present invention.

FIG. 4 is a partial enlarged cross-sectional view schematically showing a spindle motor according to a second embodiment of the present invention. As shown in the figure, the spindle motor is the same as the spindle motor of FIG. 1, except for an oil interface forming member 240b. More specifically, the cross-section in the circumferential direction of the rotating shaft for the oil interface forming member 240a is formed to have a triangular shape where one side of the upper end protrudes towards the sleeve. In addition, the oil interface forming member 240b is formed to be inclined downwards from the side of the sleeve 230, thereby making it possible to facilitate workability at the time of the oil injection.

Figure 5:
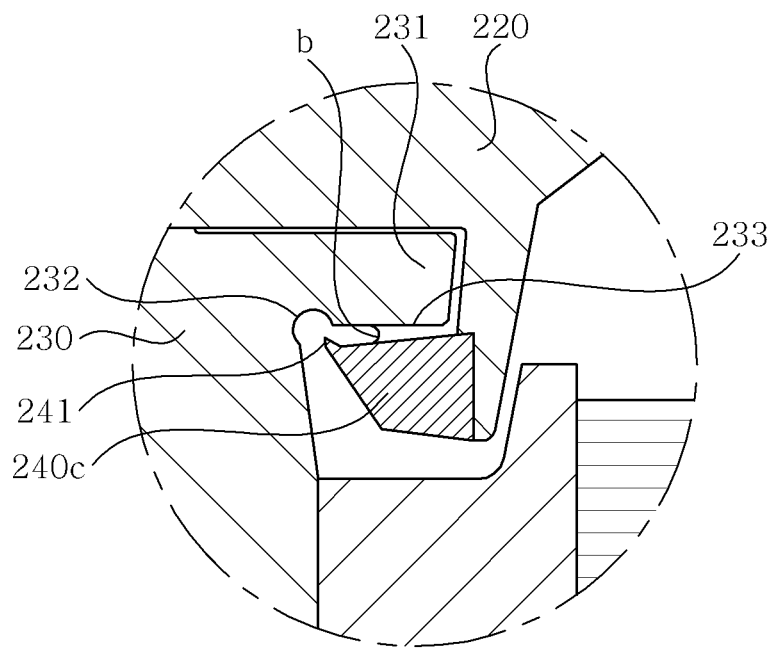
FIG. 5 is a partial enlarged cross-sectional view schematically showing a spindle motor according to a third embodiment of the present invention.

FIG. 5 is a partial enlarged cross-sectional view schematically showing a spindle motor according to a third embodiment of the present invention. As shown in the figure, the spindle motor is the same as the spindle motor according to the first embodiment of the present invention as shown in FIGS. 2 and 3, except for an oil interface forming member 240c. The oil interface forming member 240c further includes a projection part 241 compared with the oil interface forming member 240a according to the first embodiment as shown in FIG. 2. The projection part 241 protrudes towards the groove part 232 of the sleeve. The oil interface forming member 240c is formed with the projection part 241 as described above, thereby making it possible to prevent the leakage of oil even if the oil interface collapses. In addition, it is preferable that the projection part 241 is spaced from the groove part 232 by 100 μm or more so that a needle perforates therethrough.

Figure 6:
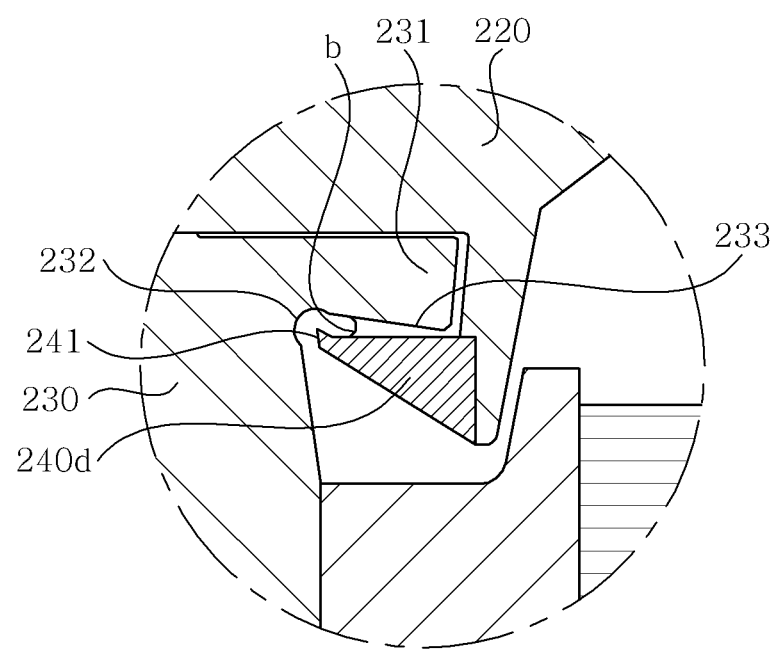
FIG. 6 is a partial enlarged cross-sectional view schematically showing a spindle motor according to a fourth embodiment of the present invention.

FIG. 6 is a partial enlarged cross-sectional view schematically showing a spindle motor according to a fourth embodiment of the present invention. As shown in the figure, the spindle motor is the same as the spindle motor according to the first embodiment of the present invention as shown in FIGS. 2 and 3, except for an oil interface forming member 240d. The oil interface forming member 240d further includes a projection part 241 compared with the oil interface forming member 240b according to the second embodiment as shown in FIG. 4. The projection part 241 protrudes towards the groove part 232 of the sleeve. The oil interface forming member 240d is formed with the projection part 241 as described above, thereby making it possible to prevent the leakage of oil even if the oil interface collapses.

According to the present invention, the spindle motor that forms the interface of oil, used as a fluid dynamic bearing, in an axial direction of the shaft so as to be strong against external impact and prevent the leakage of oil, thereby lengthening the life span of the motor and improving efficiency thereof. Further, the spindle motor includes the oil interface forming member coupled to the hub and forms the protruding part on the oil interface forming member, thereby preventing the leakage of oil.

Although the preferred embodiments of the present invention have been disclosed for illustrative purposes, they are for specifically explaining the present invention and thus a spindle motor according to the present invention is not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A spindle motor having a fluid dynamic bearing as an oil gap formed between a rotator and a stator, the spindle motor comprising:
   the stator comprising a sleeve having a protruding part extending in a circumferential direction formed on an upper part thereof; and
   the rotator comprising a hub including an oil interface forming member positioned under the protruding part of the sleeve and coupled to the hub,
   wherein an oil interface of the oil gap is formed between an upper part of the oil interface forming member and a lower part of the protruding part of the sleeve, the sleeve is provided with a groove part formed on the protruding part and to correspond to the oil interface forming member, and the oil interface forming member is provided with a projection part protruding towards the groove part of the sleeve.

2. The spindle motor as set forth in claim 1, wherein a cross-section in the circumferential direction of a rotating shaft for the oil interface forming member is formed to have a trapezoid shape where one side of the oil interface forming member protrudes towards the sleeve.

3. The spindle motor as set forth in claim 1, wherein the lower part of the protruding part of the sleeve is provided with an inclined part so that an extension part in the circumferential direction is inclined downwards.

4. The spindle motor as set forth in claim 1, wherein the oil interface forming member is fixed to the hub by laser welding.

5. The spindle motor as set forth in claim 1, wherein a cross-section in the circumferential direction of the rotating shaft for the oil interface forming member is formed to have a triangular shape where one side of the oil interface forming member protrudes towards the sleeve.

6. The spindle motor as set forth in claim 5, wherein the lower part of the protruding part of the sleeve is provided with an inclined part so that an extension part in the circumferential direction is inclined downwards.

7. The spindle motor as set forth in claim 5, wherein the oil interface forming member is fixed to the hub by selecting one of laser welding, bonding, and screwing.

\* \* \* \* \*